(12) United States Patent
Ovshinsky et al.

(10) Patent No.: US 6,318,453 B1
(45) Date of Patent: Nov. 20, 2001

(54) HYDROGEN COOLED HYDROGEN STORAGE UNIT HAVING MAXIMIZED COOLING EFFICIENCY

(75) Inventors: Stanford R. Ovshinsky, Bloomfield Hills; Rosa T. Young, Troy, both of MI (US)

(73) Assignee: Energy Conversion Devices, Inc., Troy, MI (US)

( * ) Notice: Subject to any disclaimer, the term of this patent is extended or adjusted under 35 U.S.C. 154(b) by 0 days.

(21) Appl. No.: 09/558,827

(22) Filed: Apr. 26, 2000

(51) Int. Cl.[7] ................................... F28D 15/00
(52) U.S. Cl. ................. 165/104.12; 62/46.2; 62/480; 62/477; 165/10; 165/DIG. 902
(58) Field of Search .................. 165/104.12, DIG. 902, 165/10; 62/48.1, 477, 480, 46.2

(56) References Cited

U.S. PATENT DOCUMENTS

| | | | |
|---|---|---|---|
| 4,270,360 | * | 6/1981 | Nakane et al. ........................... 62/48 |
| 4,402,915 | * | 9/1983 | Nishizaki et al. ........................ 62/48 |
| 4,723,595 | * | 2/1988 | Yasunaga et al. ............... 165/104.12 |
| 5,025,635 | * | 6/1991 | Rockenfeller et al. ................. 62/480 |
| 5,184,669 | * | 2/1993 | Tamme et al. .................... 165/104.12 |
| 5,571,251 | * | 11/1996 | Gamou et al. ................... 165/104.12 |
| 5,778,972 | * | 7/1998 | Sapru et al. ..................... 165/104.12 |

* cited by examiner

Primary Examiner—Ira S. Lazarus
Assistant Examiner—Terrell McKinnon
(74) Attorney, Agent, or Firm—David W. Schumaker; Marvin S. Siskind (57) ABSTRACT

A hydrogen cooled hydrogen storage unit which employs excess hydrogen flow through flow channels between hydrogen storage alloy plates in order to provide convective cooling of the plates. The unit provides for high packing density of the storage materials and ease of expansion of storage capacity by merely adding more storage material plates. Since the hydrogen flows transversely between the plates and does not flow along the entire length of the stack, the cooling flow path of the hydrogen is short, and the temperature differential between any point of the stack and the hydrogen coolant is maximized, which maximizes the cooling efficiency of the unit.

23 Claims, 6 Drawing Sheets

HYDROGEN COOLED HYDROGEN STORAGE UNIT HAVING MAXIMIZED COOLING EFFICIENCY

FIELD OF THE INVENTION

The instant application relates to hydrogen cooled hydrogen storage units, and more specifically to a unit which maximizes the cooling efficiency thereof, while also providing for a high packing density of the storage materials therein, and ease of expansion of storage capacity by merely adding more storage material plates.

BACKGROUND OF THE INVENTION

The instant patent application describes a hydrogen storage unit useful for a hydrogen-based economy. The storage unit allows for fast and efficient cooling and/or heating thereof using gaseous hydrogen as a direct, convective heat transfer medium. The unit maximizes the cooling efficiency of the storage material therein while providing for a high packing density of the storage materials and ease of expansion of storage capacity by merely adding more storage material plates. The instant storage unit is useful in a hydrogen-based economy.

An infrastructure for such a hydrogen-based economy is disclosed in U.S. application Ser. No. 09/444,810, entitled "A Hydrogen-based Ecosystem" filed on Nov. 22, 1999 for Ovshinsky, et al. (the '810 application), which is hereby incorporated by reference. This infrastructure, in turn, is made possible by hydrogen storage alloys that have surmounted the chemical, physical, electronic and catalytic barriers that have heretofore been considered insoluble. These alloys are fully described in copending U.S. patent application Ser. No. 09/435,497, entitled "High Storage Capacity Alloys Enabling a Hydrogen-based Ecosystem", filed on Nov. 6, 1999 for Ovshinsky et al. (the '497 application), which is hereby incorporated by reference.

Hydrogen storage units have a number of requirements. First and foremost, they are required to be able to store hydrogen. This bare minimal requirement is met by many prior art storage units. However, to be commercially useful in a hydrogen-based economy, the hydrogen storage unit requires many more properties. One requirement is a high specific capacity hydrogen storage material. Such materials were invented by the instant inventors and are disclosed in the '497 application. Another requirement is a unit which has a high volumetric and gravimetric packing density of storage materials. One such unit is also disclosed in the '497 application.

A further requirement is a unit that has the ability to be cooled a high rate. This is required to be able to quickly charge hydrogen into the unit while maintaining proper operating temperature by removing the heat of hydride formation. The instant inventors have determined that maximal cooling using minimal hardware can be achieved using excess hydrogen flow though the system to remove the heat. A system which employs hydrogen cooling is also disclosed in the '497 application. However, such a unit also requires high cooling efficiency. To achieve this maximal efficiency, the temperature between the cooling hydrogen and the heated storage materials must be maximized, while maintaining the storage material at its proper operating temperature. This requires that the temperature rise of the cooling hydrogen over the entire length of contact between the hydrogen and the storage material be minimal. Prior hydrogen-cooled units fail to achieve this goal.

In addition to being able to quickly and efficiently cool the hydrogen storage materials within the storage unit, the hydrogen storage materials must be heated quickly and efficiently to release hydrogen therefrom during use. To accomplish this, there must be efficient thermal transfer from the source thereof through the bulk of the storage material. While most systems will transfer this heat, they do not do so efficiently.

Finally, for many applications ease of capacity expansion is a must. While many prior art systems do not allow for expansion, some do. However, with most systems, expansion of the amount of hydrogen storage materials reduces the cooling and heating efficiency.

Therefor, what is needed in the art is a high capacity hydrogen storage unit having high volumetric and gravimetric storage capacity (i.e., high packing density of storage materials), which is capable if being cooled at a high rate with maximal efficiency, is capable of efficient heat transfer from an internal heat source throughout the storage material, and is expandable without losing any of the aforementioned properties.

SUMMARY OF THE INVENTION

The instant invention is a hydrogen-cooled hydrogen storage unit. The unit employs excess hydrogen flow through flow channels between hydrogen storage alloy plates in the hydrogen storage unit in order to provide convective cooling of the plates. The unit provides for high packing density of the storage materials and ease of expansion of storage capacity by merely adding more storage material plates. Also, because the hydrogen flows transversely between the plates, not along the entire length of the stack, the cooling flow path of the hydrogen is much shorter, and the temperature differential between any point of the stack and the hydrogen coolant is maximized, which maximizes the cooling efficiency of the unit. The unit also allows for efficient radial thermal transfer of heat energy from a central source of heat through the plates thereof during discharge of the stored hydrogen.

The hydrogen-gas-cooled hydrogen storage unit includes a stack of a plurality of hydrogen storage alloy plates disposed within a storage unit casing. The unit also includes hydrogen flow channels between the hydrogen storage alloy plates. The flow channels provide for transverse pathways between the plates to allow for high speed hydrogen gas flow. A portion of the hydrogen is stored within the storage material and releases its heat of hydride formation. The remainder of the hydrogen flows through the hydrogen flow channels at a sufficient mass flow rate to remove the heat of hydride formation.

The unit casing also includes a hydrogen inlet port, a hydrogen inlet manifold, a hydrogen outlet manifold, a hydrogen outlet port and hydrogen deflection walls, which are designed and integrated such that hydrogen: 1) flows into the unit through the hydrogen inlet port, 2) is distributed throughout said hydrogen inlet manifold, 3) is then forced though said hydrogen flow channels by said hydrogen deflection walls, 4) is collected in said hydrogen outlet manifold, and 5) exits the unit though said hydrogen outlet port.

DETAILED DESCRIPTION OF THE INVENTION

There is disclosed herein a hydrogen-cooled hydrogen storage unit. The unit employs excess hydrogen flow through flow channels between hydrogen storage alloy plates in the hydrogen storage unit in order to provide convective cooling of the plates. The storage unit of the instant invention provides for very good packing density of the storage materials and ease of expansion of storage capacity, by merely adding more storage material plates. Also, the addition of more plates does not interfere with the proper hydrogen cooling of the storage unit of the instant invention because of its unique design. That is, because the hydrogen flows transversely between the plates and does not flow along the entire length of the stack, the cooling flow path of the hydrogen is much shorter, and thus the temperature rise of any of the cooling hydrogen is much smaller. Thus, the temperature differential between any point of the stack and the hydrogen coolant is maximized, which maximizes the cooling efficiency of the unit.

Any alloy which safely and efficiently stores and releases hydrogen may be used in the storage unit of the instant invention. Specifically useful are alloys such as Ti—Zr based room temperature hydrogen storage alloys and high capacity Mg-based storage alloys. The most useful alloys are the high-capacity, high-kinetics hydrogen storage alloys of the '497 application. In general the alloys contain greater than about 90 weight % magnesium, and contain at least one modifier element. The at least one modifier element creates a magnesium based alloy which is capable of storing at least 6.9 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

Figure 1:
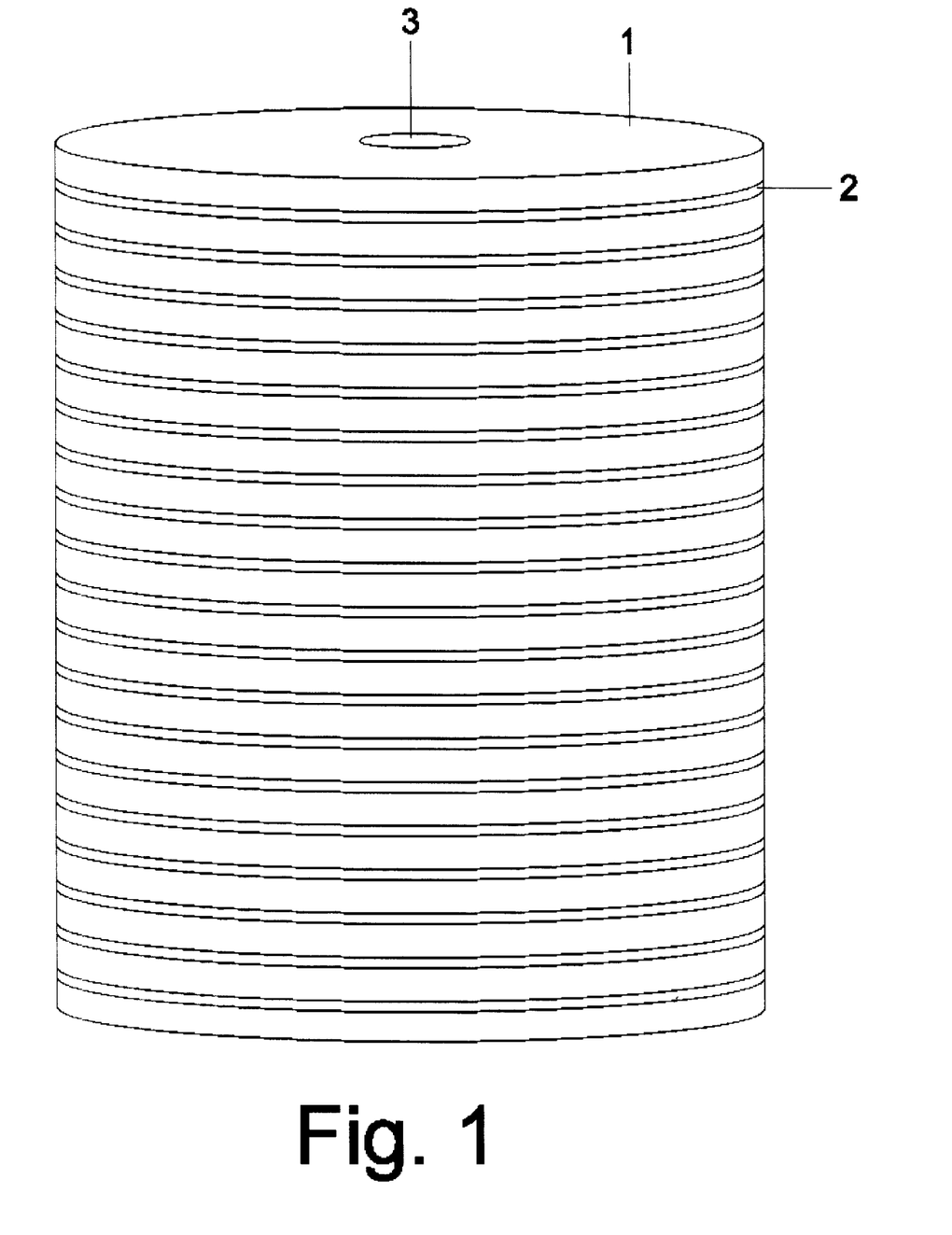
FIG. 1 is a schematic depiction, not to scale, of a stack of hydrogen storage plates and flow channels according to the instant invention.

FIG. 1 is a schematic depiction, not to scale, of a stack of hydrogen storage plates 1 and flow channels 2 according to the instant invention. During charging, hydrogen flows through the flow channel regions 2. Some of the hydrogen is adsorbed into the hydrogen storage alloy and the excess hydrogen passes through the flow channel region and out the other side. As hydrogen is adsorbed into the hydrogen storage material of the plates 1, it releases it's heat of hydride formation, which is carried away by the excess hydrogen that passes through the channel regions 2. The stack of plates and flow channels include a central opening 3 into which a heater can be place to allow the stack to be heated during discharge, thereby providing the heat necessary to desorb the hydrogen.

Figure 2:
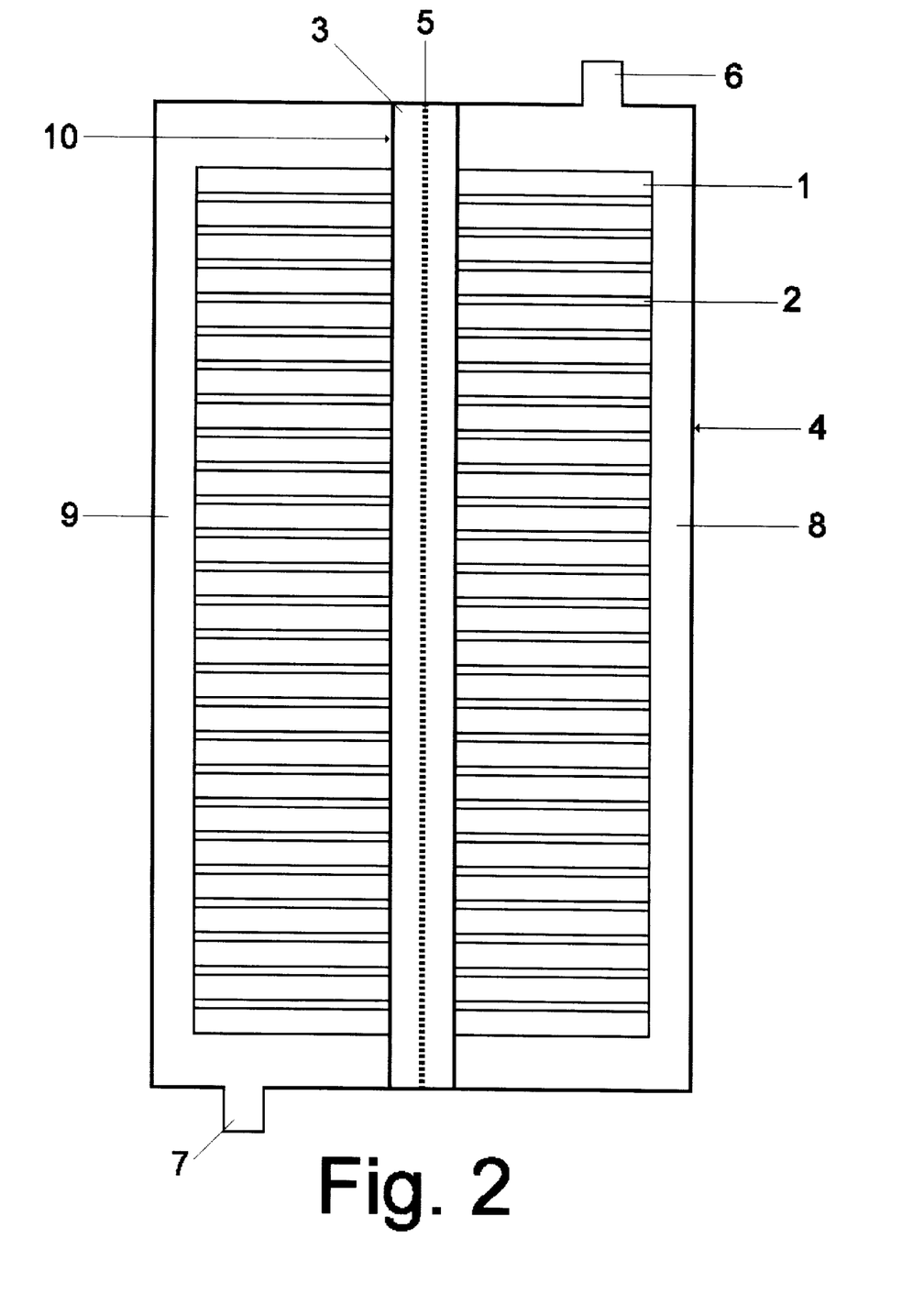
FIG. 2 is a cross sectional view of a schematic depiction, not to scale, of the hydrogen storage unit of the instant invention.

FIG. 2 is a cross sectional view of a schematic depiction, not to scale, of the hydrogen storage unit of the instant invention. The unit specifically includes a casing 4, which houses stack of storage material plates 1 and flow channels 2. The casing 4 includes a hydrogen inlet port 6, though which hydrogen flows into the unit during charging, and a hydrogen outlet port 7, through which hydrogen flows out of the unit during charging and discharging. The unit also includes hydrogen inlet manifold 8 region which distributes the incoming hydrogen among all of the flow channel regions 2, and a hydrogen outlet manifold 9 which collects the excess hydrogen flowing out of the flow channel regions 2. The unit also includes hydrogen deflection walls 5, which extend the entire length of the casing 4. The deflection walls 5 prevent hydrogen from passing directly from the inlet manifold 8 to the outlet manifold 9, thus forcing the hydrogen to flow through channel regions 2. Finally, the unit includes a central opening wall 10. This central opening wall 10 prevents interaction between the hydrogen/storage plates 1/flow channels 2 and the interior of the central opening 3. Thus, hydrogen which is in the storage plates 1 and flow channels 2 cannot escape into the central opening 3, and any gases or other materials in the central opening 3 do not interact with anything within the unit. For example, one of the heating units that may be placed withing the central opening 3 is a catalytic combustor. Such a heating unit combusts a fuel source (such as hydrogen) to produce heat. The central opening wall prevents the fuel, oxygen and exhaust gases from escaping from the central opening into the storage plates 1 and flow channels 2.

Figure 3:
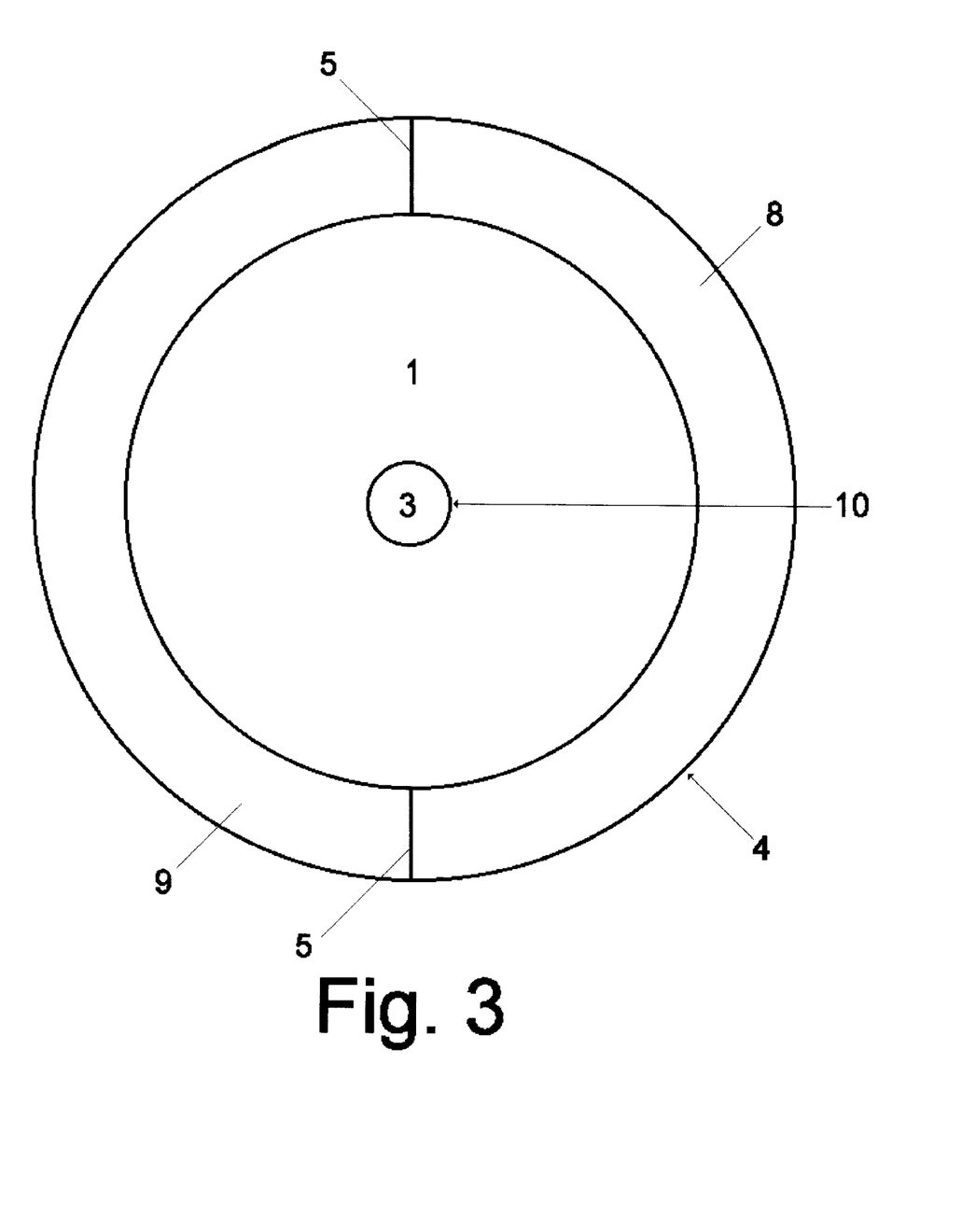
FIG. 3 is another cross sectional view of the hydrogen storage unit of the instant invention, specifically delineating the positioning of the hydrogen deflection walls and the central opening wall.

FIG. 3 is another cross sectional view of the hydrogen storage unit of the instant invention. In this view the positioning of the hydrogen deflection walls 5 and the central opening wall 10 is more clearly delineated. As can be seen, the hydrogen deflection walls 5 prevent hydrogen from passing directly from the inlet manifold 8 to the outlet manifold 9. It should be noted that while there is the possibility that the hydrogen flow may be "short circuited" around the deflection walls 5 (though a very short path in the flow channels 2), measures can be taken to prevent this from happening such as grading of the flow channel 2 porosity and size and/or grading of the thickness of the storage palates 1.

The hydrogen storage plates 1 are compacted/sintered from hydrogen storage alloy. The hydrogen storage alloy may be, if needed, bonded to a support means. The support means may be formed from a variety of materials with the appropriate thermodynamic characteristics that can help to provide heat transfer into and out of said hydrogen storage alloy. The useful materials for the support means include both metals and non-metals. Preferable metals include those from the group consisting of Ni, Al, Cu, Fe and mixtures or alloys thereof. Examples of support means that can be formed from metals include mesh, grid, matte, foil, foam and plate. This support material may also store hydrogen, which may improve the overall performance of the storage unit.

The hydrogen storage alloy material may be physically bonded to the support means by compaction and/or sintering processes. The alloy material is first converted into a fine powder. The powder is then compacted, optionally onto the support means, to form plates of storage material. The compaction process causes the powder to adhere to itself and, if included, become an integral part of the support means. After compaction, the plates, including any support means, that have been impregnated with alloy powder are preheated and sintered, if necessary. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to any support means.

Preferably the hydrogen storage alloy is compacted in hydride form. This is because the hydrogen storage alloys expand and contract as they are hydrided and dehydrided, respectively. When the materials are compacted in the non-hydride state, they expand during initial charging with hydrogen and then contract again when the hydrogen is removed (although not to the original size). This expansion during initial cycling causes the compacted material to disintegrate, risking entrainment of the storage material in the hydrogen flow. However, when the alloy is compacted in hydride form, all of the initial expansion is built in to the compact, thus when the material is cycled the effects of expansion/contraction is minimized. It should be noted that the compacts may be formed in the desired end shape by this process, thereby minimizing additional machining to form the final shape of the storage material. Also, any additional components of the system may be molded directly into the shape. Thus, any flow channels, or heating elements, etc. may be directly integrated with the formed shaped compact.

The formed hydrogen storage alloy compact may be encapsulated by a porous encapsulant material which prevents entrainment of the hydrogen storage material in the high flow rate hydrogen. The encapsulant sheet can be pressed onto the storage alloy compact during formation. While the porous sheet may be formed from polymers it is preferably composed of material which is thermally conductive, such as metals, or even thermally conductive non-metals. Examples of polymers would be porous polypropylene sheet porous polytetrafluoroethylene sheet. The metal may be capable of storing hydrogen also, thereby enhancing the overall storage capacity of the system. Useful metals include Cu, Ni and Al and mixtures or alloys thereof. Useful non-metals can include thermally conductive ceramics and thermally conductive graphite materials. Once again, the non-metal may also store hydrogen, thereby enhancing the storage capacity of the system.

Compacting and sintering the alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the storage alloy/support means throughout the interior of the container provides for an even temperature and heat distribution throughout the bed of alloy material. This results in more uniform rates of hydrogen absorption and desorption throughout the entirety thereof, thus creating a more efficient energy storage system.

Once the compacted storage material plates 1 are produced, they are stacked with flow channel materials 2. The flow channel are preferably formed from very porous materials. The flow channel regions 2 provide for high speed flow of hydrogen through the storage bed, allowing for hydrogen cooling of the bed. Some of the hydrogen is adsorbed into the alloy material, and the remainder of the hydrogen carries away the heat of hydride formation. The porous materials are preferably selected form foam, matte, mesh or expanded materials. They are preferably formed from metals, but may also be formed from thermally conductive non-metals. The materials from which the flow channels are formed should be non-reactive with the storage unit materials, but they may also store hydrogen. Exemplary materials are metals such as nickel, aluminum, and copper and thermally conductive non-metals such carbon materials. The most preferred materials are nickel or aluminum foams. The flow channels should be highly porous to allow for high speed flow of hydrogen, but must still provide for mechanical support of the storage plate stack. The foam flow channel regions are preferably between 0.1 and 2 mm thick.

As an alternative to using specific materials to form the flow channels 2, the hydrogen storage plates may be corrugated on one or both surfaces such that when they are stacked (preferably with the encapsulant material discussed above), the stack will have incorporated, therewithin, hydrogen flow channels 2 due to the corrugation. This alternative method of forming the flow channels 2 has the advantage of reducing the overall weight of the storage unit, while maximizing the storage capacity thereof.

The storage plates 1 may be of any size and shape, but preferably are in the shape of disks. The disks are preferably between 5 mm and 3 cm thick, and have diameters up to 12 inches. The disks preferably have a central annular opening 3, into which (when incorporated into the stack) combustive or electric heaters may be inserted to assist in release of the hydrogen, if needed for the end use applications. The plates can be 100 percent dense (with respect to the hydride state) or can have porosity "built in" to compensate for expansion/contraction during cycling. Once the plates are manufactured, adding capacity to any hydrogen storage unit is as simple as packing the required number of plates into a single or multiple casings 4.

Figure 4:
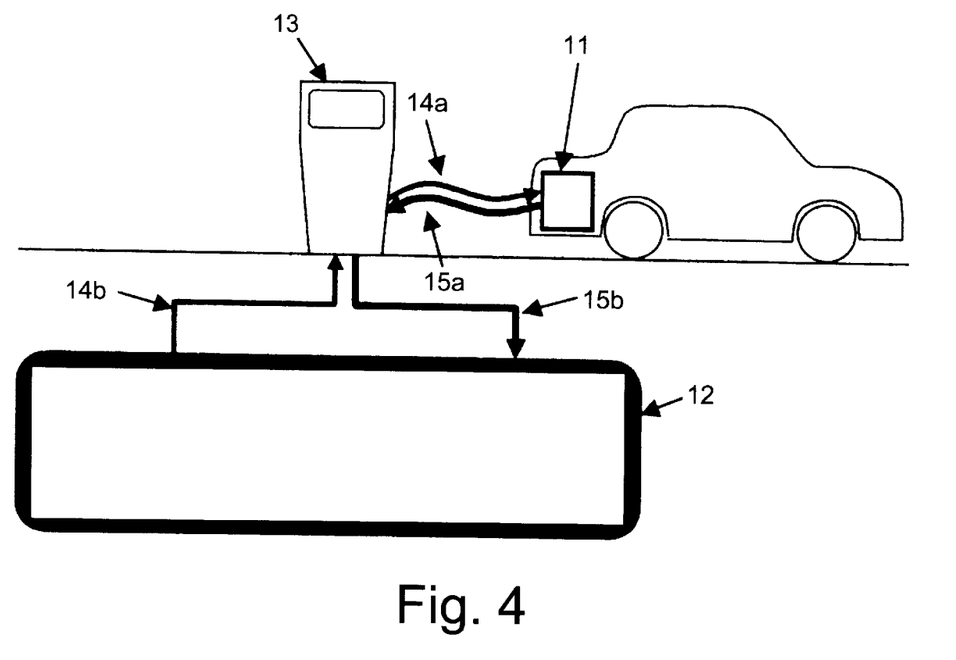
FIG. 4 is a stylistic depiction of a hydrogen refueling station.

FIG. 4 is a stylistic depiction of a hydrogen refueling station which specifically shows how hydrogen is used to capture the heat of hydride formation in the vehicles storage bed 11 and transfer that heat to the stations primary hydride storage bed 12 to assist in the release of hydrogen from the primary storage bed. Specifically, high flow rate hydrogen is dispensed from the "pump" 13 into the vehicle's hydrogen storage bed 11 through cool hydrogen supply line 14a. Some of the hydrogen is absorbed into the hydrogen storage material within the bed, thereby releasing heat of hydride formation. This heat is removed by the excess cool hydrogen. The now heated hydrogen leaves storage bed 11 and is transported to the pump 13 via hot hydrogen return line 15a. The hot hydrogen is then transported from the pump 13 to the stations primary hydrogen storage bed 12 via hot hydrogen return line 15b. The hot hydrogen releases its heat into the hydrogen storage material within bed 12 to assist in providing the required heat (heat of dehydriding) to release the stored hydrogen therein. The released hydrogen, now cooler, is supplied to the pump 13, via cool hydrogen supply line 14b, to ultimately be sent again to the vehicles hydrogen storage bed 11. This set up allows for very fast charging of a vehicle's storage bed 11, and yet eliminates the loss of the released heat and overheating of the bed.

Hydrogen Powered Internal Combustion Engine and Fuel Cell Vehicles

The instant storage unit is useful as a hydrogen supply for many applications. One such application is the field of automobiles. Specifically, the storage unit can be used as a source of hydrogen for internal combustion engine (ICE) or fuel cell (FC) vehicles.

Figure 5:
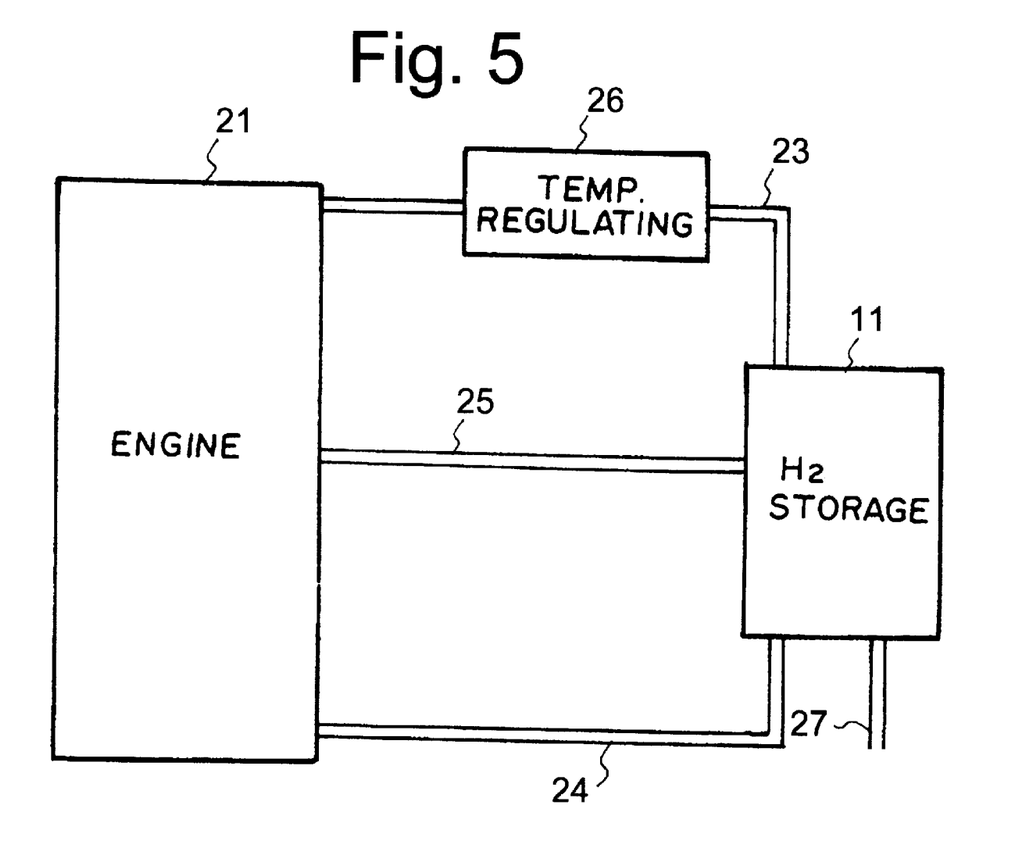
FIG. 5 shows a schematic representation of a hydrogen gas supply system for powering an internal combustion engine vehicle.

FIG. 5 shows a schematic representation of a hydrogen gas supply system for an ICE vehicle, which is for supplying a hydrogen engine 21 with hydrogen gas. The system has a hydrogen gas storage bed 11 and an engine waste heat transfer supply passage 23 which leads engine waste heat (in the form of exhaust gas or engine coolant) discharged from the engine 21 to the hydrogen gas storage bed 11. The system also includes a return passage 24 for returning any engine coolant used to heat the hydrogen storage material back to the engine 21 and an exhaust gas vent 27 for releasing used exhaust gas. The system further includes a hydrogen gas supply passage 25 which leads hydrogen gas from the hydrogen gas storage bed 11 to the engine 21. The engine waste heat transfer supply passage 23 is provided with a temperature regulating unit 26 which regulates the temperature of the waste heat to be introduced into the hydrogen gas storage bed 11. With such a system, waste heat generated within the ICE can be efficiently used to heat the hydrogen storage material to release hydrogen therefrom for use in the ICE.

Figure 6:
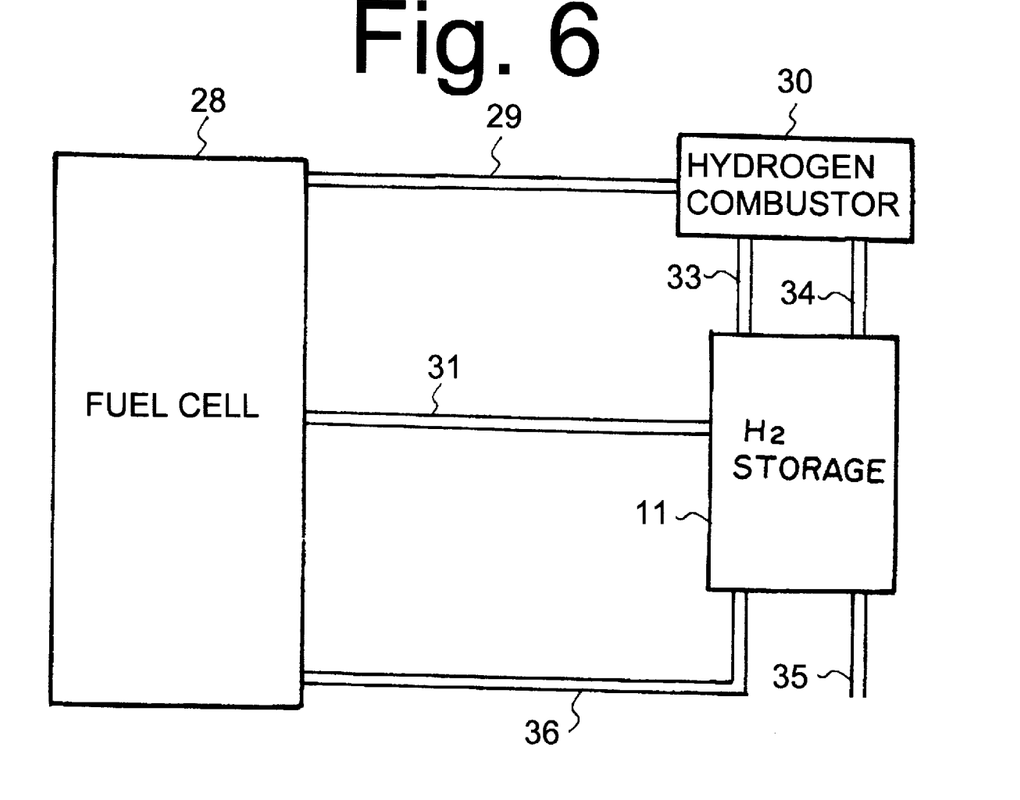
FIG. 6 shows a schematic representation of a hydrogen gas supply system for powering for a fuel cell vehicle.

FIG. 6 shows a schematic representation of a hydrogen gas supply system for an FC vehicle, which is for supplying a fuel cell 28 with hydrogen gas. The system has a hydrogen gas storage bed 11 and a fuel cell waste heat/hydrogen transfer supply passage 29 which leads fuel cell waste heat and unused hydrogen discharged from the fuel cell 28 to a hydrogen gas combustor 30. Waste heat from the fuel cell may be in the form of heated gases or heated aqueous electrolyte. The hydrogen combustor 30, heats a thermal transfer medium (preferably in the form of the aqueous electrolyte from the fuel cell) utilizing waste heat from the fuel cell 28, and by combusting hydrogen. Hydrogen is supplied to the combustor 30 via unused hydrogen from the fuel cell 28, and via fresh hydrogen supplied from the hydrogen storage bed 11 via hydrogen supply line 34. Heated thermal transfer medium is supplied to the hydrogen storage bed 11 via supply line 33. The system also includes a return passage 36 for returning any fuel cell aqueous electrolyte used to heat the hydrogen storage material back to the fuel cell 28 and an exhaust gas vent 35 for releasing used combustor gas. The system further includes a hydrogen gas supply passage 31 which leads hydrogen gas from the hydrogen gas storage bed 11 to the fuel cell 28.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen gas cooled hydrogen storage unit comprising:
    a storage unit casing,
    a stack of a plurality of hydrogen storage alloy plates disposed within said storage unit casing;
    hydrogen flow channels provided between said hydrogen storage alloy plates, said flow channels providing transverse pathways between said hydrogen storage alloy plates to allow for high speed hydrogen gas flow, a portion of said hydrogen being stored within said storage material and releasing heat of hydride formation and the remainder of said hydrogen flowing through said hydrogen flow channels at a sufficient mass flow rate to remove said heat of hydride formation;
    said unit casing including: a hydrogen inlet port; a hydrogen inlet manifold; a hydrogen outlet manifold; a hydrogen outlet port and hydrogen deflection walls; and
    wherein said hydrogen inlet port, said hydrogen inlet manifold, said hydrogen outlet manifold, said hydrogen outlet port and said hydrogen deflection walls are designed and integrated such that hydrogen:
        1) flows into the unit through the hydrogen inlet port,
        2) is distributed throughout said hydrogen inlet manifold, 3) is then forced though said hydrogen flow channels by said hydrogen deflection walls, 4) is collected in said hydrogen outlet manifold, and 5) exits the unit though said hydrogen outlet port.

2. The hydrogen gas cooled hydrogen storage unit of claim 1, wherein said hydrogen storage alloy plates are formed from compacted powered hydrogen storage alloy materials.

3. The hydrogen gas cooled hydrogen storage unit of claim 2, wherein said hydrogen storage alloy plates are formed form compacted powered alloy physically bonded to a support means.

4. The hydrogen gas cooled hydrogen storage unit of claim 3, wherein said hydrogen storage alloy is physically bonded to said support means by compaction and/or sintering.

5. The hydrogen gas cooled hydrogen storage unit of claim 3, wherein said support means comprises at least one selected from the group consisting of mesh, grid, matte, foil, foam and plate.

6. The hydrogen gas cooled hydrogen storage unit of claim 3, wherein said support means is formed from a metal.

7. The hydrogen gas cooled hydrogen storage unit of claim 6, wherein said support means is formed from one or more metals selected from the group consisting of Ni, Al, Cu, Fe and mixtures or alloys thereof.

8. The hydrogen gas cooled hydrogen storage unit of claim 2, wherein said storage alloy plates are formed from compacted hydrided powered alloy materials.

9. The hydrogen gas cooled hydrogen storage unit of claim 8, wherein said storage alloy plates are formed into disks.

10. The hydrogen gas cooled hydrogen storage unit of claim 8, wherein said disks are between 5 mm and 3 cm in thickness and are up to 12 inches in diameter.

11. The hydrogen gas cooled hydrogen storage unit of claim 1, wherein said hydrogen flow channels are formed from a porous material disposed between said storage alloy plates.

12. The hydrogen gas cooled hydrogen storage unit of claim 11, wherein said porous material is a porous mesh, grid, matte, foam or expanded metal.

13. The hydrogen gas cooled hydrogen storage unit of claim 12, wherein said porous material is formed from nickel, aluminum, copper or carbon.

14. The hydrogen gas cooled hydrogen storage unit of claim 13, wherein said hydrogen flow channels are between 0.1 mm and 2 mm thick.

15. The hydrogen gas cooled hydrogen storage unit of claim 1, wherein said hydrogen flow channels are formed by corrugating at least one surface of said plates before forming said stack.

16. The hydrogen gas cooled hydrogen storage unit of claim 15, wherein said plates are further surrounded by a porous encapsulating material.

17. The hydrogen gas cooled hydrogen storage unit of claim 16, wherein said porous encapsulating material surrounding said hydrogen storage alloy plates is a thin, porous sheet.

18. The hydrogen gas cooled hydrogen storage unit of claim 17, wherein said porous encapsulating material surrounding said hydrogen storage alloy plates is a thin, porous polymer sheet.

19. The hydrogen gas cooled hydrogen storage unit of claim 18, wherein said porous encapsulating material surrounding said hydrogen storage alloy plates is a thin, porous polypropylene sheet.

20. The hydrogen gas cooled hydrogen storage unit of claim 18, wherein said porous encapsulating material surrounding said hydrogen storage alloy plates is a thin, porous polytetrafluoroethylene sheet.

21. The hydrogen gas cooled hydrogen storage unit of claim 17, wherein said porous encapsulating material surrounding said hydrogen storage alloy plates is a thin, porous metal sheet.

22. The hydrogen gas cooled hydrogen storage unit of claim 21, wherein said porous metal sheet is formed from at least one metal selected from Ni, Al, Cu, and mixtures or alloys thereof.

23. The hydrogen gas cooled hydrogen storage unit of claim 17, wherein said porous encapsulating material surrounding said hydrogen storage alloy plates is a thin, porous graphite sheet.

* * * * *